United States Patent [19]

Dornau et al.

[11] Patent Number: 5,250,598
[45] Date of Patent: Oct. 5, 1993

[54] LIQUID ELECTRICAL TAPE FORMULATION

[76] Inventors: Peter Dornau, 4041 SW. 47 Ave., Ft. Lauderdale, Fla. 33314; Robert R. Russo, 35 Carlton Ave., East Rutherford, N.J. 07073; Jeffrey Tieger, 10180 SW. 4th, Plantation, Fla. 33324

[21] Appl. No.: 683,580

[22] Filed: Apr. 10, 1991

Related U.S. Application Data

[63] Continuation of Ser. No. 424,466, Oct. 20, 1989, abandoned.

[51] Int. Cl.$^5$ .............. C08K 5/01; C08K 5/02; C08K 5/07; C08K 5/12
[52] U.S. Cl. .................. 524/297; 524/114; 524/364; 524/524
[58] Field of Search .............. 524/114, 297, 364, 524

[56] References Cited

U.S. PATENT DOCUMENTS

| | | | |
|---|---|---|---|
| 2,427,513 | 9/1947 | Spessard | 524/364 |
| 3,011,999 | 12/1961 | Parker et al. | 524/114 |
| 4,447,569 | 5/1984 | Brecker et al. | 524/297 |
| 4,571,410 | 2/1986 | Nevins et al. | 524/524 |
| 4,683,263 | 7/1987 | Taira et al. | 525/57 |

FOREIGN PATENT DOCUMENTS

| | | | |
|---|---|---|---|
| 735859 | 8/1955 | United Kingdom | 524/297 |

OTHER PUBLICATIONS

Fore et al., "Epoxidized Jojoba Oil as a Stabilizer for Vinyl Chloride Containing Plastics", *The Journal of the American Oil Chemists' Society*, Sep. 1958, vol. XXXV, No. 9, pp. 469–472.

"Adhesive Intermediates", Union Carbide Corp., Product Bulletin, New York, 1970, p. 11.

"The Condensed Chemical Dictionary", 10th Ed., Gessner G. Hawley, Van Nostrand Reinhold, N.Y., 1981, p. 677.

*Primary Examiner*—Joseph L. Schofer
*Assistant Examiner*—R. H. Delmendo

[57] ABSTRACT

A quick drying liquid electrical tape formulation having good shelf life. The formulation forms a durable vinyl coating or film on wires, junctions and objects. The formulation is comprised of at least about 10% of a vinyl material effective to achieve the durable vinyl coating. The formulation further includes a thixotropic agent to add body, and a plasticizer to impart flexibility to the vinyl coating. The vinyl material, thixotropic agent and plasticizer are admixed with solvents comprising at least one drying agent. The formulation further including a stabilizing agent and at least one solvent, such that the thixotropic agent and plasticizer enable the application of a satisfactory coating using the formulation.

9 Claims, No Drawings

LIQUID ELECTRICAL TAPE FORMULATION

This application is a continuation of application Ser. No. 07/424,466, filed Oct. 20, 1989, now abandoned.

BACKGROUND OF THE INVENTION

This invention relates to a liquid electrical tape formulation and more particularly, to a liquid electrical tape formulation that is vinyl resin based and which is solubilized into a mixture of organic solvents, and further includes a thixotropic agent, a plasticizer and a stabilizer, preferably an epoxy stabilizer.

Liquid electrical tape formulations have been developed in recent years to achieve an insulating coating, for instance, for protecting electrical connections, although such formulations have uses that range far beyond electrical connections, namely, to any object or area where an insulating or protective coating is desired, particularly where it is difficult to use conventional insulating tape.

A particular field where liquid electrical tape formulations have become popular, is in the marine or boating field.

However, it has been determined that the liquid electrical tape formulations heretofore known tended either to have poor spreading or film forming characteristics or tended to become brittle after application as time goes by.

Yet another problem with prior liquid electrical formulations is that of shelf life. Long shelf life has been difficult to obtain since prior liquid electrical tape formulations normally had the property of quick hardening. Thus, such formulations would tend to set, harden or polymerize in the container.

OBJECTS OF THE INVENTION

Accordingly, it is a principal object of the present invention to provide a liquid electrical tape formulation, possessing all of the desirable features of a liquid electrical tape formulation, but yet also having significant shelf life.

Yet another object of the present invention is to provide a liquid electrical tape formulation which can be brushed on or dipped onto various types of electrical connections, objects and other areas to be protected.

Still another object of the present invention is to provide a liquid electrical tape formulation that quickly dries to a tough, yet flexible, ultraviolet resistant, dielectric coating which seals out dirt, moisture and water, thereby preventing corrosion.

Yet another object of the present invention is to provide a liquid electrical tape formulation that forms a protective dielectric coating of flexible vinyl material.

A further object of the present invention is to provide a liquid electrical tape formulation that adheres to metal, plastic, vinyl, rubber and composite surfaces.

Still another object of the present invention is to provide a liquid electrical tape which will hold wires and terminals together, thereby preventing loose connections due to vibration.

A further object of the present invention is to provide an economical liquid electrical tape that is safe and easy to use and is also fast drying.

BRIEF STATEMENT OF INVENTION

The foregoing as well as other objects of the invention are achieved by providing a liquid electrical tape formulation that was originally developed for the boat building industry where electrical connections are continuously exposed to vibration and moisture or, in some cases, are actually under water. In such harsh environment, standard electrical tape or shrink tubing does not perform well and can actually promote corrosion by allowing water to be trapped around electrical connections.

Moreover, standard electrical tape or shrink tubing cannot be used on very thin wiring, screw terminals or difficult to reach connections.

Examples of usage of the liquid electrical tape formulation of the present invention include bilge pumps, outdoor exposed wiring, sprinkler pumps, timers, underground wiring, outdoor lighting fixtures, instruments, computers and other places where a weatherproof and dependable connection is needed or where irregular shapes are involved.

In the preferred embodiment of the present invention, the liquid electrical tape formulation is a vinyl resin that is solubilized into a mixture of organic solvents, with the further presence of a thixotropic agent, a plasticizer and a stabilizer, preferably an epoxy stabilizer.

DESCRIPTION OF PREFERRED EMBODIMENT

The foregoing basic formulation is preferably comprised of a copolymer of vinyl compounds, namely, vinyl chloride and vinyl acetate wherein the polyvinyl chloride is present in a significant majority amount. For ease of reference, these and any other polyvinyl materials will be referred to as "vinyl" or "vinyl material". The second component of the present invention is a thixotropic agent, the third component is a plasticizer and the fourth component is a stabilizer. Also, in the preferred embodiment there is a mixture of three solvents, namely, methyl ethyl ketone, toluene and methylene chloride.

A preferred formulation in accordance with the present invention is in weight percentages:

(1) vinyl copolymer (23.68%)—VYHH
(2) AC 4 Pliolite (1.52%)—thixotrope
(3) Dioctyl phthalate (9.31%)—plasticizer
(4) epoxy stabilizer (ERL 42-21 (Union Carbide)) (5%)
(5) methyl ethyl ketone (38.52%)
(6) toluene (13.88%)
(7) methylene chloride (13.10%)

The first component is preferably a mixture of vinyl compounds, since the film forming protective features for satisfying the objectives of the invention basically flow from the presence of at least one vinyl compound. A preferred vinyl copolymer is identified as VYHH that is made by the Union Carbide Company. The VYHH is a vinyl copolymer that is a basic coating agent which provides good adhesion. It should be understood that other vinyl materials may be employed in the present formula. The VYHH copolymer is composed of 86% by weight of vinyl chloride and 14% by weight of vinyl acetate. It has an approximate specific gravity of 1.36 and is normally presented in a solid granular form that is readily soluble in solvents used with the present invention. This will be covered in the method of preparing the formulation of the present invention. If the vinyl component is substantially entirely vinyl chloride, the vinyl component will be less soluble in the other components, particularly, the solvents and will also be too crystalline. The presence of some polyvinyl acetate will facilitate the formation of a good clear solution in the overall formulation.

The percentage of the vinyl copolymer component may vary from about 10% to 60% by weight of the total mix. However, the preferred amount is about 25% by weight. This amount will contribute sufficient vinyl material to make for a durable film of protective vinyl on the wire or junction or article to which the formulation of the present invention is applied.

The next ingredient is a thixotropic agent, exemplified by AC 4 Pliolite (manufactured by the Goodyear Corporation of Akron, Ohio) which may vary in the preferred liquid electrical tape formulation from about 1% to 2% by weight. The AC 4 Pliolite is manufactured by the Goodyear Company. Other compatible thixotropic agents may be used in place of the specific AC 4 Pliolite. AC 4 Pliolite is a modified vinyl toluene acrylate copolymer having a melting point of 54° C. and a specific gravity of 2.08. The purpose of the thixotropic agent is to lend body or thickness to the overall liquid electrical tape formulation. This will bring about not only better film forming properties, but more importantly, will prevent the formulation from running. Rather, the formulation will tend to adhere to the surface to which it has been applied. If too much thixotropic agent is used, the overall formulation will not pour well. If too little is used, the formulation may be thin and runny. Examples of other thixotropic agents that will function satisfactorily in the present formulation are organic clays, fumed silicas and aluminum compounds.

The next component is a plasticizer exemplified by dioctyl phthalate. This plasticizer affords to the dried or set liquid electrical tape formulation, the property of being flexible. Thus, the finished or set "tape" will not crack or separate under the force of vibration. The plasticizer may vary in the preferred liquid electrical tape formulation from about 5% to 15% by weight. If too much plasticizer is used, the formulation will "weep" as the plasticizer migrates to the surface. Examples of other plasticizers that will function satisfactorily in the present formulation are castor oil, other phthalates and soy bean based plasticizers.

It is important that the ratio of vinyl component to dioctyl phthalate or other plasticizer be in the vicinity of 2.5:1. Increases beyond this ratio will result in a relatively rigid final coating that will fracture and separate from the substrate on which the liquid electrical tape formation is coated. Should the ratio drop to 2:1 or less, then the formulation may not harden well.

Then, there is the stabilizer exemplified by the epoxy stabilizer. The preferred epoxy stabilizer is known as ERL 42-21 and is made by Union Carbide Co. It is preferred that this stabilizer be present in an amount of about 5% in the overall formulation. Another epoxy stabilizer, used in an amount of about 3% in the overall formulation is made by Shell Corporation and is known as Shell Epon 828. It has been determined that the formulation of the present invention without the stabilizer will in storage at elevated temperatures, tend to release acid which will interact with the inside surface of a metal container. These in turn will initiate unwanted polymerization of the vinyl resin. The epoxy stabilizer is comprised of one or more functional liquid epoxy resins and may vary in the preferred liquid electrical tape formulation from about ¼% to 6% by weight. Non-epoxy stabilizers, compatible with other ingredients in the present formulation may be used to prevent premature polymerization of the formulation.

Finally, there are the solvents. Toluene is present because it is a very effective drying agent. However, it is a significantly flammable product whose flammability is controlled with the presence of the methylene chloride component. There is also a significant amount of methyl ethyl ketone in the preferred formulation as it is an effective solvent for both the vinyl component and the thixotropic agent to keep these two components in solution. Also, methyl ethyl ketone affords additional quick drying properties to the overall formulation although it is quite flammable.

The preferred range of methyl ethyl ketone is from about 20% to 40% by weight. When the levels of methyl ethyl ketone are reduced to a level of approximately 20% it would be near to impossible to keep the vinyl and rubber based resin in solution and you would get a seeding out or thickening of a percentage of the mass. When the level of methyl ethyl ketone is increased over 40%, a dramatic increase in the dry rate will be noted and stability in small quantities will be reduced significantly.

The preferred range of toluene is from about 10% to 15% by weight. If the amount of toluene exceeds 20%, the overall formulation will "skin" immediately and/or flash too quickly. It may even dry on the brush. Where toluene falls to less than about 10%, the vinyl component could precipitate out of solution.

The final solvent is methylene chloride which has good flammability resistance (raises flashpoint to exceed 20° F.). Methylene chloride adds good film forming or coating properties. It is preferably present in a weight percentage range of from 10 to 20%.

PREPARATION METHOD

The liquid electrical tape formulation of the present invention is prepared by first introducing methyl ethyl ketone and toluene in a closed vessel. Then, the thixotropic agent such as AC 4 Pliolite and the vinyl resin are slowly fed into the closed vessel under continuous agitation that is sufficient enough to insure proper dispersion. Mixing should continue for at least 30 minutes and then there should be a check for completeness of dispersion. This can be done by obtaining a sample from the closed vessel and pouring some of it on a glass plate such that particles that are not dissolved in the formulation are easily observable.

Then, the methyl chloride is added, followed by another 15 minutes of mixing action. This is followed by the slow addition of the dioctyl phthalate so as not to shock the solution.

After the dioctyl phthalate has been added, the viscosity should be checked. Here, a satisfactory of viscosity is between 2,000 and 2,500 centipoise on a Brookfield viscometer at 78° F., 20 RPM and a #4 spindle. This reading should be taken after five revolutions. Any adjustments to viscosity should be made using a combination of methyl ethyl ketone and toluene in a roper ratio of about 3:1 as set forth in the preferred formula. Such adjustment of viscosity continues until the target of 2,000 to 2,500 centipoise is achieved.

In testing the present formulation has consistently formed excellent coatings even after having been maintained in 4 fluid ounce (240 ml) metal containers for at least 3 months at a temperature in the range of 60° F. to 80° F. When applied as a coating the formulation did not run or drip even when coated on a wire, cable or object maintained at 250° F. After exposure at 0° F. for 72 hours the coating maintained its flexibility and adhesion to the substrate.

TINTING

The basic formulation produced is colorless. Should it be desired that the formula have color, it is necessary to prepare a coloring material that will be used in a ratio of about 3 parts by weight to 97 parts of the basic liquid electrical tape formulation.

The coloring material has the following formulation by weight:
23 4% VYHH
1.50% AC 4
36.70% Methyl Ethyl Ketone
13% Toluene
12% Methylene Chloride
9.30% Dioctyl Phthalate
3.1% Talc The talc in the foregoing formulation is a dispersant.

The mixture for the colorant to tint the base is as follows:

White, Red and Green should encompass;
66.30% Dioctyl Phthalate
0.70% Neosperse/657 Cosperse (dispersant)
33% Titanium Dioxide (for white color only), or 33% Phthalo Green (for green color only) or 33% Red 2B (for red color only)

The foregoing should be prepared in a high speed disperser and should be checked to insure proper dispersion.

The black tinting base is as follows:
58 70% Dioctyl Phthalate
1.97% Neosperse/657 Cosperse (codispersent)
39.40% Carbon Black The evaluation of the viscosity is as set forth in the preparation method for the basic formulation as previously described.

From the foregoing, it can be seen that there is provided, a liquid electrical tape formulation which has excellent shelf life and yet when applied to a desired surface, will form a vinyl resin film that is sufficiently flexible to be durable under the stress of vibration and will not readily crack for any other reason.

Without further elaboration, the foregoing will so fully illustrate our invention that others may, by applying future knowledge, adopt the same for use under various conditions of service.

What is claimed as the invention is:

1. A thermoplastic liquid electrical tape formulation having good shelf life, said formulation in itself forming a durable vinyl coating or film or wires, junctions and objects, said formulation consisting essentially in weight percentages of from 10 to 60% of an electrically insulating vinyl material effective to achieve said durable vinyl coating, said vinyl material consisting essentially of a vinyl chloride copolymer including a major amount of vinyl chloride and a minor amount of vinyl acetate, said formulation further including from 1 to 2% of a vinyl toluene/acrylate copolymer thixotropic agent to add body, and 5 to 15% of a plasticizer to impart flexibility to the vinyl coating, said formulation further including a stabilizing agent present in an amount of about 3 to 5% to prevent acid release, and at least one solvent present in an amount from 20 to 40% to enable the application of a satisfactory coating.

2. The formulation of claim 1 wherein said vinyl material is present in an amount of about 25%.

3. The formulation of claim 1 wherein said stabilizing agent is an epoxy based stabilizer present in an amount effective to prevent premature polymerization of the formulation.

4. The formulation of claim 1 wherein the plasticizer is dioctyl phthalate.

5. The formulation of claim 4 wherein the ratio by weight of vinyl material to dioctyl phthalate is in the range of about 2.5 to 1.

6. The formulation of claim 1 wherein toluene is present in the formulation as a solvent.

7. The formulation of claim 1 wherein toluene is present in an amount from 10 to 15% by weight of the total formulation.

8. The formulation of claim 6 and further including methyl ethyl ketone, present in a weight percent of the overall formulation, from 20 to 40%.

9. The formulation of claim 8 and further including methylene chloride present in a weight percent of the overall formulation, from 10 to 20%.

* * * * *